Nov. 4, 1930.    L. R. BESTER    1,780,516
LOCOMOTIVE POWER PLANT
Original Filed Feb. 28, 1930
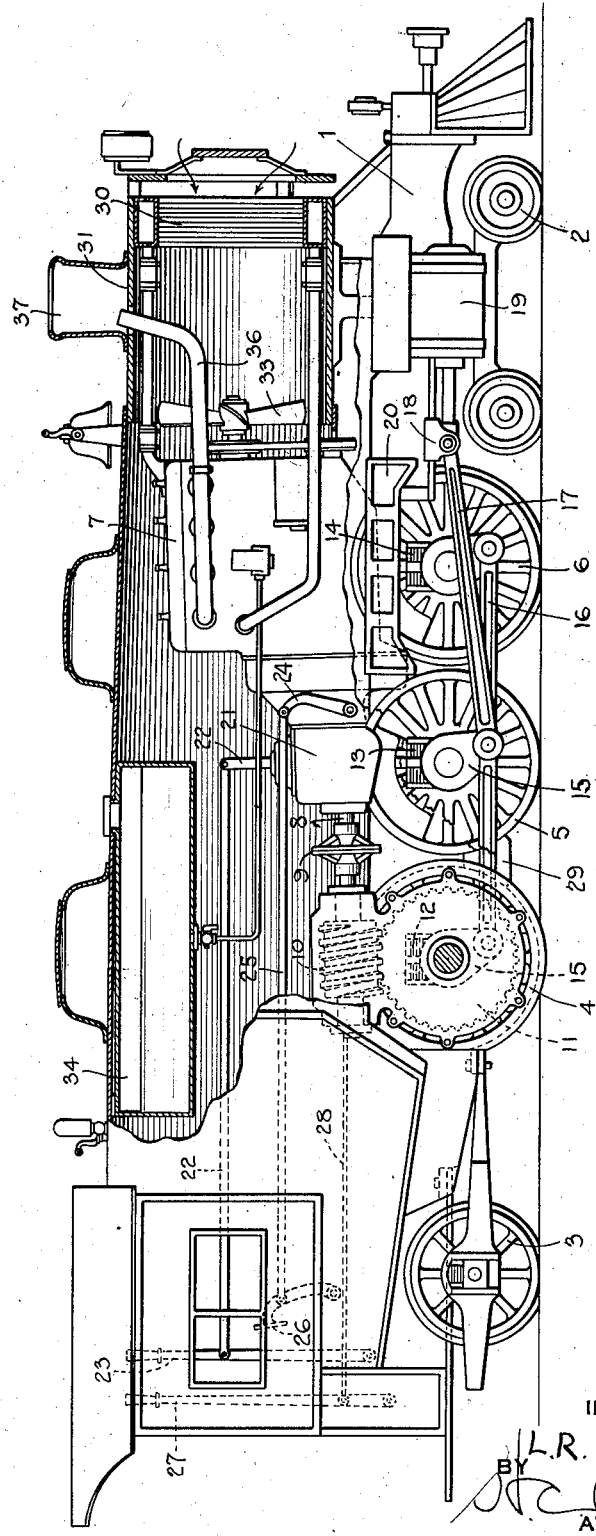
INVENTOR
L.R. Bester
BY
ATTORNEY Patented Nov. 4, 1930

1,780,516

UNITED STATES PATENT OFFICE

LEONARD R. BESTER, OF LONG ISLAND CITY, NEW YORK

LOCOMOTIVE POWER PLANT

Original application filed February 28, 1930, Serial No. 432,076. Divided and this application filed May 2, 1930. Serial No. 449,112.

This invention relates to locomotive structures, more particularly to locomotives having internal combustion engines as sources of power. This application is a division of my co-pending application Serial No. 432,076, filed Feb. 28, 1930, entitled "Miniature locomotive structure."

The present invention is more directly concerned with a type of locomotive having a plurality of sets of driving wheels, generally two or three sets, and having also additional wheels in the front and rear of the locomotive. The power plant consists of an internal combustion engine, a transmisison casing and a gear connection to the driving wheels which is placed directly above said wheels. One or more radiators for cooling the circulating water of the engine is placed at the front end of the locomotive and the structure is such as to allow air to be drawn in through the front and thus cool the radiators. If desired a radiator may be placed in the rear end of the locomotive and utilized for part or all of the cooling.

In the accompanying drawing constituting a part hereof, the single figure is a side view of a locomotive constructed in accordance with the present invention, some parts being shown in section, and other parts being omitted.

The structure includes a main frame 1, the forward part of which is shown in the drawing, to which is pivotally secured the pilot truck 2. At the rear of the frame is a trailer truck 3 similarly secured. Three pairs or sets of driving wheels 4, 5 and 6 are mounted and held in the frame 1 at approximately the center portion of the locomotive structure.

Secured to the frame and substantially directly above the set of driving wheels 6 is an internal combustion engine 7, the driving shaft 8 thereof extending rearwardly and being connected to a flexible joint 9 located just forward of driving wheels 4 and approximately one-half way between the axles of driving wheels 4 and 5. A worm 10 secured to the flexible joint 9 and placed directly over the axle of driving wheels 4 cooperates with gear wheel 11 secured to said axle.

The rear wheels 4 are sometimes provided with springs 12 to provide a flexible connection to the frame of the locomotive, but ordinarily these springs are omitted and the wheels 4 rigidly connected to the frame. Driving wheels 5 and 6 are provided with springs 13 and 14 respectively, giving a flexible connection to the locomotive frame. Each of the driving wheels has a crank 15, the cranks on either side of the locomotive being secured to a side rod 16 and the middle driving wheels 5 also have a connecting rod 17 secured to a cross-head 18 which has a piston rod operating in a dummy cylinder 19. A bracket 20 on the frame keeps the cross-head in proper position at all times.

The transmission 21 of the engine is located approximately above driving wheels 5 and has levers 22 extending rearwardly therefrom into the cab of the engine and terminating in lever 23 whereby the operator may readily control the shifting of the transmission gears. Clutch lever 24 has an extension 25 terminating in a pedal 26 in the cab so that the operator may readily throw the clutch in or out of position. A lever 27, also in the cab, is connected by rods 28 to brake shoes 29 interposed between the several adjacent driving wheels.

A circular radiator 30 is mounted in the front of the locomotive and has suitable connections for water circulation to the engine 7. In front of the radiator is a circular plate, spaced away from the locomotive shell 31 so as to allow currents of air to pass through the radiator as shown by the arrows. If desired a rectangular radiator may be used in place of radiator 30 and be held in the locomotive shell 31 by means shown in the original application of which the present case is a division. A fan 33 draws air through the radiator and thus cools the water. A longitudinal gasoline tank 34, having a filling opening at the top of the locomotive shell, supplies fuel to the engine. The exhaust pipe 36 of the engine extends into a smoke stack 37 at the front of the shell so that the exhaust simulates the exhaust of a steam engine.

By the novel arrangement of the several parts of my locomotive I have obtained a compact arrangement in which various elements are so placed as to operate effectively within the confines of the locomotive shell. This permits of an exterior appearance of pleasing proportions so that the locomotive has the appearance of a modern type of steam locomotive and the power plant is placed in such a position as to effectively utilize the limited space and to operate efficiently. My invention, although having been described in rather specific terms, is not limited to details as those skilled in the art may readily vary such details within the scope of my invention which is set forth in the claims appended hereto.

What I claim is:—

1. A locomotive comprising a frame, three sets of driving wheels held therein, and an internal combustion engine located above said wheels, and a boiler shell enclosing said engine.

2. A locomotive comprising a frame, three sets of driving wheels held therein, and an internal combustion engine placed above the forward set of wheels, and a boiler shell enclosing said engine.

3. A locomotive comprising a frame, three sets of driving wheels held therein, and an internal combustion engine placed above the forward set of wheels, the drive shaft thereof extending rearwardly, and a boiler shell enclosing said engine.

4. A locomotive comprising a frame, three sets of driving wheels held therein, an internal combustion engine placed above the forward set of wheels, the drive shaft thereof extending rearwardly, change speed gearing, a shaft extending rearwardly therefrom and a direct driving connection to the rear set of wheels, and a boiler shell enclosing said engine.

5. A locomotive comprising a frame, three sets of driving wheels held therein, an internal combustion engine placed above the forward set of wheels, the drive shaft thereof extending rearwardly, change speed gearing, a shaft extending rearwardly therefrom and a direct driving connection to the rear set of wheels by a worm and wheel arrangement, and a boiler shell enclosing said engine.

6. A locomotive comprising a frame, three sets of driving wheels held therein, an internal combustion engine placed above the forward set of wheels, the drive shaft thereof extending rearwardly, a worm on said shaft, and a gear wheel mounted on the axle of the rear driving wheels and meshing with said worm, and a boiler shell enclosing said engine.

7. A locomotive comprising a frame, three sets of driving wheels held therein, an internal combustion engine placed above the forward set of wheels, the drive shaft thereof extending rearwardly, a worm on said shaft, a gear wheel mounted on the axle of the rear driving wheels and meshing with said worm, and a flexible joint on said shaft located just forward of said rear driving wheels, and a boiler shell enclosing said engine.

8. A locomotive comprising a frame, three sets of driving wheels held therein, an internal combustion engine placed above the forward set of wheels, the drive shaft thereof extending rearwardly, a worm on said shaft, a gear wheel mounted on the axle of the rear driving wheels and meshing with said worm, a flexible joint on said shaft located just forward of said rear driving wheels, and a transmission casing located above the center driving wheels, and a boiler shell enclosing said engine.

9. A locomotive comprising a frame, three sets of driving wheels held therein, an internal combustion engine placed above the forward set of wheels, the drive shaft thereof extending rearwardly, a worm on said shaft, a gear wheel mounted on the axle of the rear driving wheels and meshing with said worm, a flexible joint on said shaft located just forward of said rear driving wheels, a transmission casing located above the center driving wheels, and a boiler shell enclosing said engine, casing, joint and worm.

In testimony whereof, I have hereunto subscribed my name this 30th day of April, 1930.

LEONARD R. BESTER.